US010640116B2

(12) United States Patent
Oyama (10) Patent No.: US 10,640,116 B2
(45) Date of Patent: May 5, 2020

(54) TRAVELING CONTROL SYSTEM AND METHOD FOR VEHICLE

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 181 days.

(21) Appl. No.: 15/915,759

(22) Filed: Mar. 8, 2018

(65) Prior Publication Data

US 2018/0281802 A1  Oct. 4, 2018

(30) Foreign Application Priority Data

Mar. 31, 2017  (JP) ................ 2017-070133

(51) Int. Cl.
*B60W 30/00* (2006.01)
*G06K 9/00* (2006.01)
(Continued)

(52) U.S. Cl.
CPC ... *B60W 30/18154* (2013.01); *G06K 9/00825* (2013.01); *B60W 2420/42* (2013.01); *B60W 2555/60* (2020.02); *B60W 2720/10* (2013.01)

(58) Field of Classification Search
CPC .. B60W 30/00; B60W 30/18154; G06K 9/00; G06K 9/00825; G08G 1/00; G08G 1/16
See application file for complete search history.

(56) References Cited

U.S. PATENT DOCUMENTS 8,977,428 B2 * 3/2015 Endo ................ G08G 1/096716
701/36
9,405,727 B2 * 8/2016 Nagata .................. B60W 30/12
(Continued)

FOREIGN PATENT DOCUMENTS

JP  2005-119413 A  5/2005
JP  2008-040795 A  2/2008
(Continued)

OTHER PUBLICATIONS

Japanese Office Action issued in corresponding Japanese Patent Application No. 2017-070133, dated Nov. 20, 2018, with English Translation.

*Primary Examiner* — Yonel Beaulieu
(74) *Attorney, Agent, or Firm* — McDermott Will & Emery LLP (57) ABSTRACT

A traveling control system for vehicle includes a map database, a detector, a traffic signal searching unit, and a speed adjusting unit. The map database is configured to store map data including information regarding one or more traffic signals on a road. The detector is configured to detect a signal state of any, of the one or more traffic signals, ahead of the own vehicle. The traffic signal searching unit is configured to search, from the map database, for a nearest traffic signal ahead of and nearest to the own vehicle. The speed adjusting unit is configured to perform, when the signal state of the nearest traffic signal is undetectable, adjustment of a passing speed at which the own vehicle passes around the nearest traffic signal, to perform a passing speed decreasing operation including decreasing of the passing speed of the own vehicle, stopping of the own vehicle, or both.

5 Claims, 4 Drawing Sheets

(51) Int. Cl.
 *G08G 1/16* (2006.01)
 *B60W 30/18* (2012.01)

(56) References Cited

U.S. PATENT DOCUMENTS

| | | | |
|---|---|---|---|
| 9,558,408 B2* | 1/2017 | Martin | G06K 9/00791 |
| 10,339,805 B2* | 7/2019 | Yamanoi | G06K 9/00825 |
| 2005/0099279 A1* | 5/2005 | Forbes | G07C 5/0891 |
| | | | 340/435 |
| 2005/0134478 A1* | 6/2005 | Mese | G08G 1/096716 |
| | | | 340/901 |
| 2008/0033625 A1 | 2/2008 | Ohtsuji | |
| 2011/0029195 A1* | 2/2011 | Yamada | G01C 21/00 |
| | | | 701/36 |
| 2016/0054138 A1* | 2/2016 | Kojo | G06T 7/60 |
| | | | 701/423 |
| 2016/0264003 A1 | 9/2016 | Yokoyama et al. | |

FOREIGN PATENT DOCUMENTS

| | | |
|---|---|---|
| JP | 2013-086580 A | 5/2013 |
| JP | 2013-184664 A | 9/2013 |
| JP | 2016-049933 A | 4/2016 |
| JP | 2017-025846 A | 2/2017 |
| WO | 2015/072286 A1 | 5/2015 |

\* cited by examiner

TRAVELING CONTROL SYSTEM AND METHOD FOR VEHICLE

CROSS-REFERENCE TO RELATED APPLICATIONS

The present application claims priority from Japanese Patent Application No. 2017-070133 filed on Mar. 31, 2017, the entire contents of which are hereby incorporated by reference.

BACKGROUND

The technology relates to a traveling control system for vehicle.

As a traveling assist technique including automatic driving for a vehicle such as an automobile, a following travel control technique has been developed recently. The following travel control performs a control to thereby cause an own vehicle to travel along a target course or to follow a preceding vehicle. When the following travel is performed automatically, it is necessary, upon passing a point provided with a traffic signal, to detect which of a red signal color, a yellow signal color, and a green signal color is indicated by the traffic signal, and to so perform a control that the own vehicle is able to safely stop, start, or pass in accordance with the detected signal color. The point provided with the traffic signal may be, for example but not limited to, an intersection.

For example, Japanese Patent Application Publication (JP-A) No. 2005-119413 discloses a traveling assistance technique described below. According to the technique disclosed in JP-A No. 2005-119413, information of a traffic signal is acquired from a traffic control center and a signal color indicated by a traffic signal at a subsequent intersection is recognized thereby. Further, braking force is generated for the vehicle, on a condition that a distance to the subsequent intersection is equal to or less than a stopping distance of a vehicle and that the signal color to be indicated by the traffic signal when the vehicle passes the intersection is "red" or "yellow to red". The foregoing situation in which the color to be indicated by the traffic signal when the vehicle passes the intersection is "yellow to red" refers to a situation in which the vehicle passes the intersection in a predetermined period before the traffic signal makes a transition in signal color from yellow to red. This makes it possible to so perform a control as to prevent the vehicle from hurriedly passing the intersection in a case where the vehicle is to pass the intersection.

SUMMARY

It is generally desired to improve, in a traveling control system for vehicle, safety in a case where a vehicle passes a periphery of a traffic signal.

It is desirable to provide a traveling control system, for vehicle, that is able to improve safety in a case where a vehicle passes a periphery of a traffic signal.

An aspect of the technology provides a traveling control system, for vehicle, that includes a map database, a detector, a traffic signal searching unit, and a speed adjusting unit. The map database is configured to store map data. The map data includes information regarding one or more traffic signals provided on a road along which an own vehicle travels. The detector is configured to detect a signal state of any, of the one or more traffic signals, that is located ahead of the own vehicle. The traffic signal searching unit is configured to search for a nearest traffic signal from the map database. The nearest traffic signal is any, of the one or more traffic signals, that is located ahead of the own vehicle and is nearest to the own vehicle. The speed adjusting unit is configured to perform, when the signal state of the nearest traffic signal searched for by the traffic signal searching unit is not detectable by the detector, adjustment of a passing speed of the own vehicle to thereby perform a passing speed decreasing operation. The passing speed is a speed at which the own vehicle passes a periphery of the nearest traffic signal. The passing speed decreasing operation includes decreasing of the passing speed of the own vehicle, stopping of the own vehicle, or both.

An aspect of the technology provides a traveling control system, for vehicle, that includes a map database and circuitry. The map database is configured to store map data. The map data includes information regarding one or more traffic signals provided on a road along which an own vehicle travels. The circuitry is configured to detect a signal state of any, of the one or more traffic signals, that is located ahead of the own vehicle. The circuitry is configured to search for a nearest traffic signal from the map database. The nearest traffic signal is any, of the one or more traffic signals, that is located ahead of the own vehicle and is nearest to the own vehicle. The circuitry is configured to perform, when the signal state of the nearest traffic signal searched for is not detectable, adjustment of a passing speed of the own vehicle to thereby perform a passing speed decreasing operation. The passing speed is a speed at which the own vehicle passes a periphery of the nearest traffic signal. The passing speed decreasing operation includes decreasing of the passing speed of the own vehicle, stopping of the own vehicle, or both.

DETAILED DESCRIPTION

A description is given below of some implementations of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale.

Figure 1:
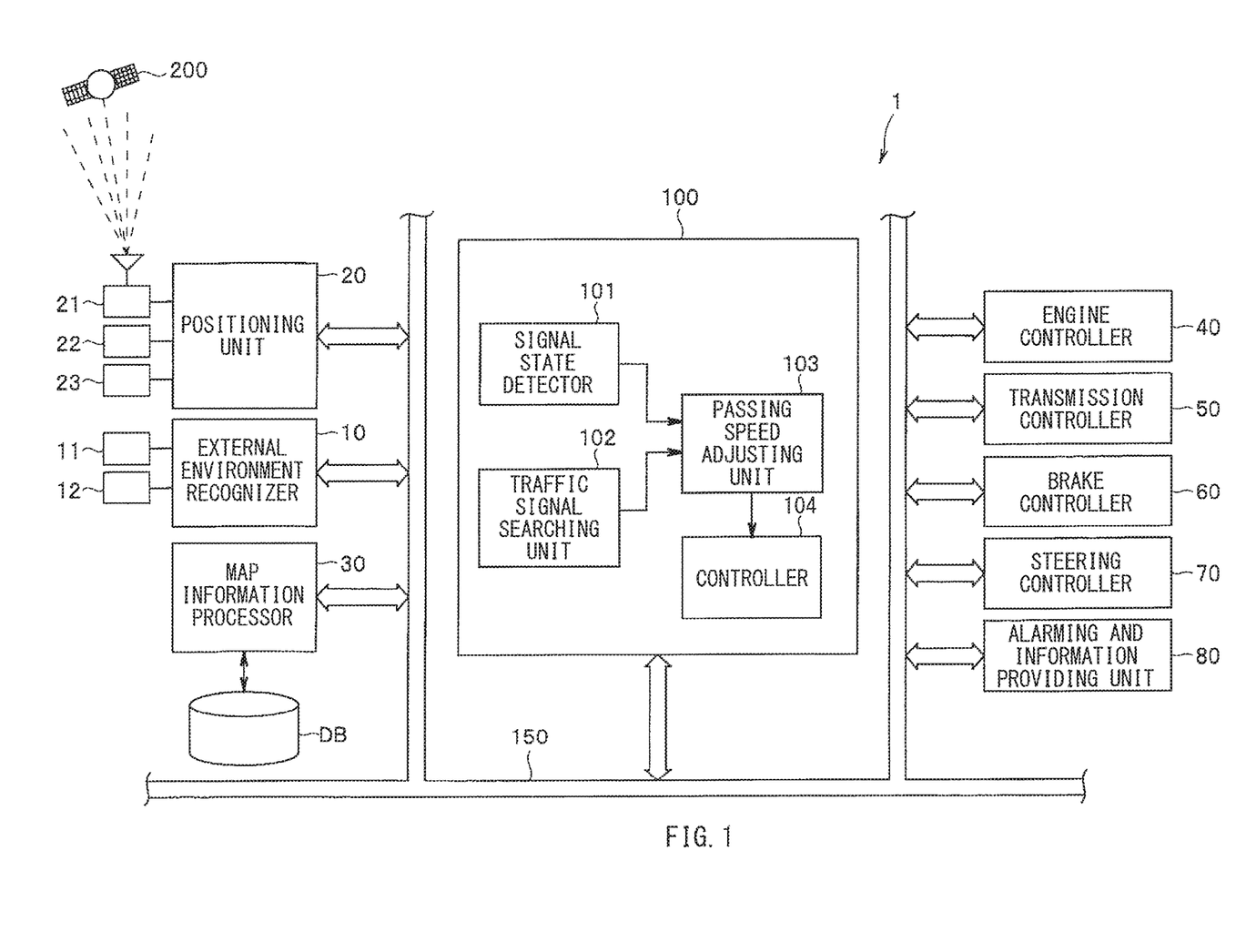
FIG. 1 is a configuration diagram illustrating an example of a traveling control system according to one implementation of the technology.

FIG. 1 is a configuration diagram illustrating a traveling control system 1 for a vehicle according to one implementation of the technology. Non-limiting examples of the vehicle may include an automobile. The traveling control system 1 may perform a traveling control including autonomous and automatic driving of the vehicle. The traveling control system 1 may include a traveling controller 100, an external environment recognizer 10, a positioning unit 20, a map information processor 30, an engine controller 40, a transmission controller 50, a brake controller 60, a steering controller 70, and an alarming and information providing unit 80. The units described above of the traveling control system 1 may be coupled to each other through a communication bus 150 that forms a network.

The external environment recognizer 10 may include a camera unit 11 mounted on the vehicle and various sensors directed to environment recognition. The various sensors may include a radar device 12 such as a millimeter-wave radar, and a LiDAR. The external environment recognizer 10 may recognize an external environment surrounding the own vehicle on the basis of detection information of an object surrounding the own vehicle, traffic information, own vehicle position information, map information, etc. The detection information of the object surrounding the own vehicle may be detected by a unit such as the camera unit 11 or the radar device 12. The traffic information may be acquired through infrastructure communication such as road-to-vehicle communication or vehicle-to-vehicle communication. The own vehicle position information may be measured by the positioning unit 20. The map information may be supplied by the map information processor 30.

In one implementation, a stereo camera may be mounted as the camera unit 11. The stereo camera may include two cameras that capture the same target from different perspectives. In such a case, it is possible to three-dimensionally recognize the external environment surrounding the own vehicle by performing a stereo process on pair of right and left images captured by the stereo camera. The camera unit 1 as the stereo camera may be provided at a location that is an upper part of the vehicle interior, inside a front window, and in the vicinity of a rearview mirror. The camera unit 11 may include two color cameras that each include an imaging device such as a charge-coupled device (CCD) or a complementary metal-oxide semiconductor (CMOS), and have their respective shutters that are driven in synchronization with each other. The two color cameras may be disposed on the right and the left in a vehicle width direction with a predetermined baseline in between.

For example, a stereo matching process may be performed on the pair of left and right images captured by the camera unit 11 as the stereo camera. By performing the stereo matching process, a pixel offset amount (i.e., a parallax) between corresponding positions in the respective right and left images may be determined and a distance image may be generated thereby. The distance image may represent luminance data, etc., as a result of conversion performed on the pixel offset amount. Points in the distance image may be subjected to coordinate conversion on the basis of the principle of triangulation. The points in the distance image may be thereby expressed as points in actual space in which the vehicle width direction of the own vehicle, i.e., a right-left direction, corresponds to an X-axis, a vehicle height direction corresponds to a Y-axis, and a vehicle length direction, i.e., a distance direction, corresponds to a Z-axis. In such a manner, the external environment may be recognized three-dimensionally. Non-limiting examples of the external environment may include a lane line (lane) of a road along which the own vehicle travels, an obstacle, or another vehicle traveling ahead of the own vehicle.

The lane line indicating a lane of the road may be recognizable by extracting, as candidates of the lane line, a group of dots from the image, and calculating a line connecting the group of candidate dots. The line connecting the group of candidate dots may be, for example but not limited to, a straight line or a curved line. For example, an edge at which luminance is varied by a predetermined amount or more may be detected on a plurality of searching lines in a lane line detection region set on the image. The plurality of searching lines may be set in the horizontal direction, i.e., the vehicle width direction, in the lane line detection region. Further, a single pair of a lane line start point and a lane line end point may be detected for each of the searching lines, on the basis of the foregoing detection of the edge. A region between the lane line start point and the lane line end point may be extracted as the lane line candidate points.

Further, time-series data, of spatial coordinate positions of the lane line coordinate points, based on a traveling amount of the vehicle per unit time may be subjected to a process to thereby calculate an approximate model of each of right and left lane lines. The lane line may be recognized on the basis of the approximate model thus calculated. The approximate model of the lane line may be, for example but not limited to, an approximate model based on coupling of straight line components calculated by Hough transform or a model approximated by a curved line such as a quadratic expression.

The positioning unit 20 may detect the own vehicle position, i.e., the position of the own vehicle, mainly by positioning based on signals obtained from a plurality of navigation satellites 200. The navigation satellites 200 may include, for example but not limited to, a global positioning system (GPS) satellite. When accuracy of the foregoing positioning may be decreased, the positioning unit 20 may detect the own vehicle position by positioning based on autonomous navigation in addition to the foregoing positioning based on the signals obtained from the navigation satellites 200. The accuracy of the positioning based on the signals obtained from the navigation satellites 200 may be decreased due to, for example but not limited to, deterioration of a state of capturing the signal (radio waves) from the navigation satellites 200, or an influence of multipath resulting from reflection of the radio waves. The positioning based on the autonomous navigation may be performed by means of the sensors mounted on the vehicle such as a gyroscope 22 or a vehicle speed sensor 23. It is to be noted that only one navigation satellite is illustrated in FIG. 1 for illustration purpose.

When the positioning unit 20 performs the positioning based on the signals obtained from the navigation satellites 200, the positioning unit 20 may receive, via a receiver 21, signals transmitted by the navigation satellites 200, and perform positioning, on the basis of the received signal, of the own vehicle position as an absolute position. The signal received from the navigation satellites 200 may include, for example but not limited to, information regarding an orbit of the navigation satellite 200, or information regarding time. The absolute position of the own vehicle may include, for example, information regarding longitude, latitude, altitude, or time. When the positioning unit 20 performs the positioning based on the autonomous navigation, the positioning unit 20 may perform positioning of the own vehicle position as an amount of relative positional variation, on the basis of a traveling distance of the own vehicle. The traveling distance of the own vehicle may be calculated on the basis of, for example but not limited to, a proceeding direction of the own vehicle detected by the gyroscope 22, a vehicle speed pulse supplied by the vehicle speed sensor 23, or any other information suitable for calculation of the traveling distance of the own vehicle.

In one implementation, the positioning unit 20 may include a communicator that is provided integrally with the positioning unit 20. The communicator may acquire the traffic information by means of infrastructure communication such as road-to-vehicle communication or vehicle-to-vehicle communication.

The map information processor 30 may be provided with a map database DB. The map information processor 30 may locate, on the basis of positional data of the own vehicle determined by the positioning unit 20, the own vehicle position on map data of the map database DB, and may output the thus-located own vehicle position. For example, the map database DB may include map data directed to navigation and map data directed to a traveling control. The map data directed to the navigation may be mainly referenced, for example, when a vehicle traveling route guidance is performed, or when a current position of the own vehicle is displayed. The map data directed to the traveling control may be higher in detail than the map data directed to the navigation, and referenced when the driving assist control, including the automatic driving, is performed.

The map data directed to the navigation may contain a previous node and a subsequent node that are coupled to a current node via their respective links. Each link may contain information regarding a factor such as a traffic signal provided on a road, a road sign, or a building. The high-definition map data directed to the traveling control may have a plurality of data points between any node and a subsequent node. Each of the data points may contain road shape data and traveling control data. The road shape data may be directed to a factor such as a curvature, a lane width, or a road shoulder width of a road along which the own vehicle travels. The traveling control data may be directed to a factor such as a road azimuth, a type of lane line of the road, or the number of lanes. The data points each may contain the road shape data and the traveling control data, together with attribute data that is related to a factor such as data reliability or data updated dates.

The map information processor 30 may perform matching between the result of the positioning of the own vehicle position and the map data. The map information processor 30 may provide, by means of an unillustrated display, the driver with information such as the traveling route guidance and the traffic information on the basis of a result of the matching. Further, the map information processor 30 may transmit, via the communication bus 150, the road shape data directed to the factor such as the curvature, the lane width, or the road shoulder width of the road along which the own vehicle travels, and the traveling control data directed to the factor such as the road azimuth, the type of lane line of the road, or the number of lanes. It is to be noted that the traveling control data may be transmitted mainly to the traveling controller 100; however, the traveling control data may be also transmitted to any other controller on an as-needed basis.

Further, the map information processor 30 may maintain and manage the map database DB and verify the nodes, the links, and the data points of the map database DB to thereby keep the latest state of the map database DB constantly. The map information processor 30 may also create and add new data for any region on the map database DB in which data is absent to thereby construct a more detailed map database DB. Updating of the map database DB and adding of the new data to the map database DB may be performed through checking the positional data determined by the positioning unit 20 against data stored in the map database DB.

The engine controller 40 may control an operating state of an unillustrated engine provided in the own vehicle, on the basis of signals supplied from various sensors detecting the operating state of the engine and various pieces of control information supplied via the communication bus 150. For example, the engine controller 40 may perform an engine control mainly including controls such as a fuel injection control, an ignition timing control, or an electronic throttle valve position control. These example controls may be performed on the basis of intake air volume, a throttle position, an engine coolant temperature, an intake air temperature, an air-fuel ratio, a crank angle, an accelerator position, and any other vehicle information, for example.

The transmission controller 50 may control a hydraulic pressure applied to an unillustrated automatic transmission, and control the automatic transmission in accordance with preset transmission characteristics. The transmission controller 50 may perform the foregoing control of the hydraulic pressure, on the basis of signals supplied from various sensors detecting a factor such as a transmission position or a vehicle speed and various pieces of control information supplied via the communication bus 150.

The brake controller 60 may control an unillustrated brake device of four wheels of the own vehicle independently of the driver's braking operation, on the basis of a brake switch status, a rotational speed of each of the four wheels, a steering angle, a yaw rate, and any other vehicle information, for example. Further, the brake controller 60 may calculate, on the basis of information on the braking force, a brake fluid pressure to be applied to each wheel, to thereby perform a control such as an antilock brake system (ABS) control or an antiskid control.

The steering controller 70 may control steering torque generated by an unillustrated electric power steering motor provided in a steering system of the own vehicle, on the basis of the vehicle speed, the steering torque based on an input received from the driver of the own vehicle, the steering angle, the yaw rate, and any other vehicle information, for example. The foregoing control of steering torque may be performed as a current control of the electric power steering motor that achieves target steering torque that brings an actual steering angle into coincidence with the target steering angle. When no override is performed as a result of a steering operation performed by the driver, a driving current of the electric power steering motor may be controlled, for example but not limited to, by a proportional-integral-differential (PID) control.

The alarming and information providing unit 80 may control an output of an alarm that notifies occurrence of abnormality in various units of the own vehicle or draws the driver's attention. The alarming and information providing unit 80 may also control an output of various pieces of information to be provided to the driver. The foregoing alarming and the providing of the various pieces of information may be performed by the use of a visual output, an auditory output, or both. The visual output may be performed through a monitor, a display, or an alarm lamp, for example. The auditory output may be performed through a speaker or a buzzer, for example. The alarming and information providing unit 80 may provide the driver with a state of the driving assist control, when the driving assist control including the automatic driving is performed. Alternatively, when the driving assist control including the automatic driving is stopped by an operation performed by the driver, the alarming and information providing unit 80 may notify the driver with the driving state of the current timing.

A description is given next of the traveling controller 100 of the traveling control system 1. When the driver set the driving mode to a cruise control mode, the traveling controller 100 may set a target course from the map database DB in accordance with the input made by the driver. Non-limiting examples of the cruise control mode may include the automatic driving or the driving assist. The driver may set the driving mode to the cruise control mode by operating a device such as an unillustrated switch or an unillustrated panel. The target course may be a course which the own vehicle follows while traveling. Further, the traveling controller 100 may so perform a traveling control as to cause the own vehicle to travel along the target course. The traveling controller 100 may perform the foregoing traveling control via the engine controller 40, the transmission controller 50, the brake controller 60, and the steering controller 70, on the basis of information such as the external environment recognition information from the external environment recognizer 10, the information acquired from each of the positioning unit 20 and the map information processor 30, or the traffic information.

Upon performing the traveling control that causes the own vehicle to travel along the target course, when a traffic signal for a vehicle is present ahead of the own vehicle, the traveling controller 100 may control the speed of the own vehicle to thereby allow the own vehicle to safely pass a periphery of the traffic signal. The traveling controller 100 may perform the foregoing control of the speed of the own vehicle on the basis of the signal color indicated by the traffic signal. When the signal color indicated by the traffic signal is indistinguishable, the traveling controller 100 may decrease the speed of the own vehicle before the own vehicle passes the periphery of the traffic signal. The traffic signal for a vehicle may be provided at a location such as an intersection or a crosswalk.

In an example case where the distinction of the signal color of the traffic signal is performed on the basis of the image captured by the camera unit 11, the distinction of the signal color may be difficult due to low visibility. Such low visibility may result from an unfavorable change in weather condition such as a snowstorm, a dense fog, or a heavy rain. In another example case where the signal color of the traffic signal is acquired through data communication with infrastructure such as a traffic control center, normal acquisition of the signal color may be prevented by a factor such as a malfunction in the traffic signal, a power failure, or radio interference. In such a case, the traveling controller 100 may decrease the speed of the own vehicle before the own vehicle passes the periphery of the traffic signal, in order to secure safety, on the assumption that the red color is indicated by the traffic signal.

The traveling controller 100 may therefore include, as function units related to a traffic signal passing control, a signal state detector 101, a traffic signal searching unit 102, a passing speed adjusting unit 103, and a controller 104. The function units described above enables the own vehicle to safely pass a point provided with the traffic signal such as an intersection during the driving assist control including the automatic driving, even for a case where the distinction of the signal color of the traffic signal is difficult. Examples of the case where the distinction of the signal color of the traffic signal is difficult may include a case where the confirmation of the traffic signal by the sensors mounted on the vehicle is prevented by low visibility, or the case where the acquisition of the traffic signal information from outside is prevented by a communication failure.

A more-detailed description is given below. The signal state detector 101 may recognize the traffic signal ahead of the own vehicle on the basis of the image captured by the camera unit 11, and detect a signal state of the recognized traffic signal. The camera unit 11 may include, for example but not limited to, a color camera. As used herein, the term "signal state" may encompass a state in which the traffic signal indicates any of the signal colors of red, yellow, and green, and a state in which distinction of any of the signal colors is prevented by a factor such as low visibility, a malfunction in the traffic signal, or a power failure. In one implementation, the signal state detector 101 may serve as a "detector".

Figure 2:
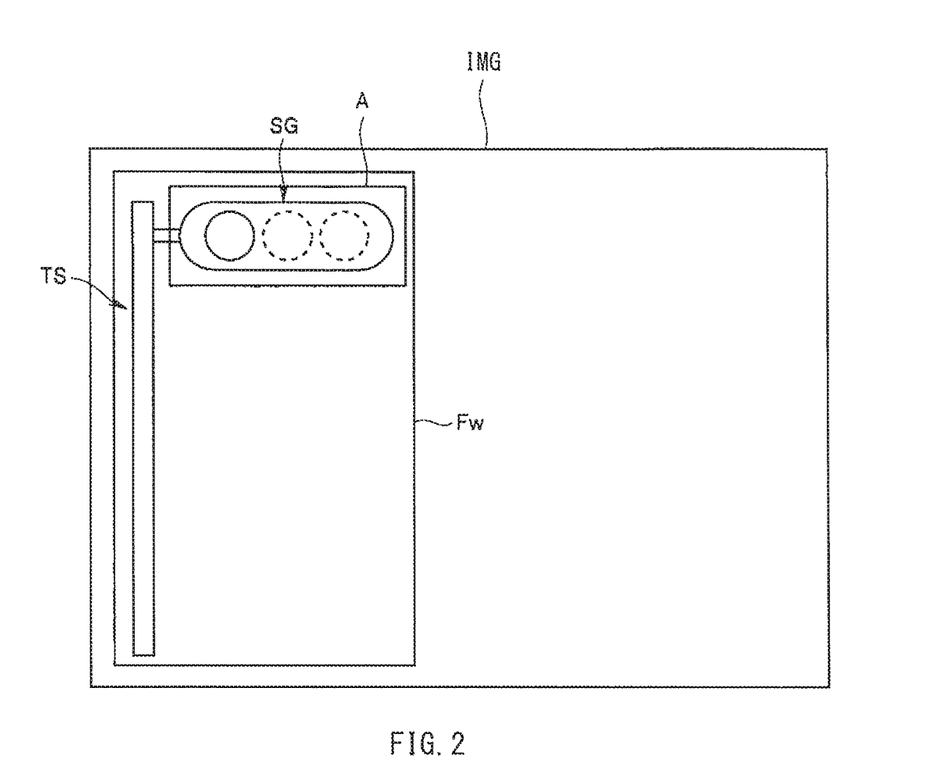
FIG. 2 is an explanatory diagram illustrating an example of how a traffic signal is recognized on the basis of an image.

The map database DB of the map information processor 30 may store information such as a position, on the map, provided with the traffic signal, a height, from a road, of a signal display unit of the traffic signal, or a signal arrangement of the signal display unit. The signal arrangement of the signal display unit may include, for example but not limited to, a lateral arrangement or a vertical arrangement. As illustrated in FIG. 2, the signal state detector 101 may set a region Fw surrounding the traffic signal TS in the captured image IMG on the basis of the map information described above, for example. Further, the signal state detector 101 may specify a region A of the signal display unit SG of the traffic signal TS on the basis of a factor such as a shape, a height, or luminance distribution. Further, the signal state detector 101 may extract a color component from the specified region A, to thereby make a distinction of the signal color indicated by the signal display unit SG.

In one implementation, the signal state of the traffic signal may be detected on the basis of the information of the traffic signal acquired by means of data communication with infrastructure such as the traffic control center, when the information of the traffic signal is acquirable through the data communication with the infrastructure.

The traffic signal searching unit 102 may search for a nearest traffic signal from the map database DB. The nearest traffic signal may be the traffic signal that is located ahead of the own vehicle and is nearest to the own vehicle. For example, the traffic signal searching unit 102 may detect a current position of the own vehicle on the high-definition map, and search, from the map database DB, for the traffic signal that is located at a position that is nearest from the position at which the own vehicle travels currently. It may be possible to capture the own vehicle position on the map with high accuracy by processing information such as: the positioning information based on the signal supplied from the navigation satellite 200; the positioning information based on the vehicle state supplied from the sensors mounted on the own vehicle such as the gyroscope 22 or the vehicle speed sensor 23; or the positional information, detected by the camera unit 11 or the radar device 12, of the own vehicle relative to a lane along which the own vehicle travels. The foregoing processing may be performed by the use of a state estimation algorism such as a Kalman filter. In one implementation, the traffic signal searching unit 102 may serve as a "traffic signal searching unit".

The passing speed adjusting unit 103 may output, to the controller 104, a speed adjustment instruction directed to increasing or decreasing of the speed of the own vehicle, in accordance with the signal state of the traffic signal searched by the traffic signal searching unit 102. When the signal state of the traffic signal is undetectable by the signal state detector 101, the passing speed adjusting unit 103 may output, to the controller 104, an instruction to so perform adjustment of a passing speed of the own vehicle as to perform a passing speed decreasing operation. The passing speed of the own vehicle may refer to the speed at which the own vehicle passes a periphery of the traffic signal. The passing speed decreasing operation may include decreasing of the passing speed of the own vehicle, stopping of the own vehicle, or both. In other words, when the signal state of the traffic signal is undetectable, the speed of the own vehicle may be decreased on the assumption that the traffic signal indicates the red signal, to thereby allow the own vehicle to be stoppable at a position before the traffic signal or before an intersection provided with the traffic signal. This secures safety and prevents an accident from occurring. In one implementation, the passing speed adjusting unit 103 may serve as a "speed adjusting unit".

Figure 3:
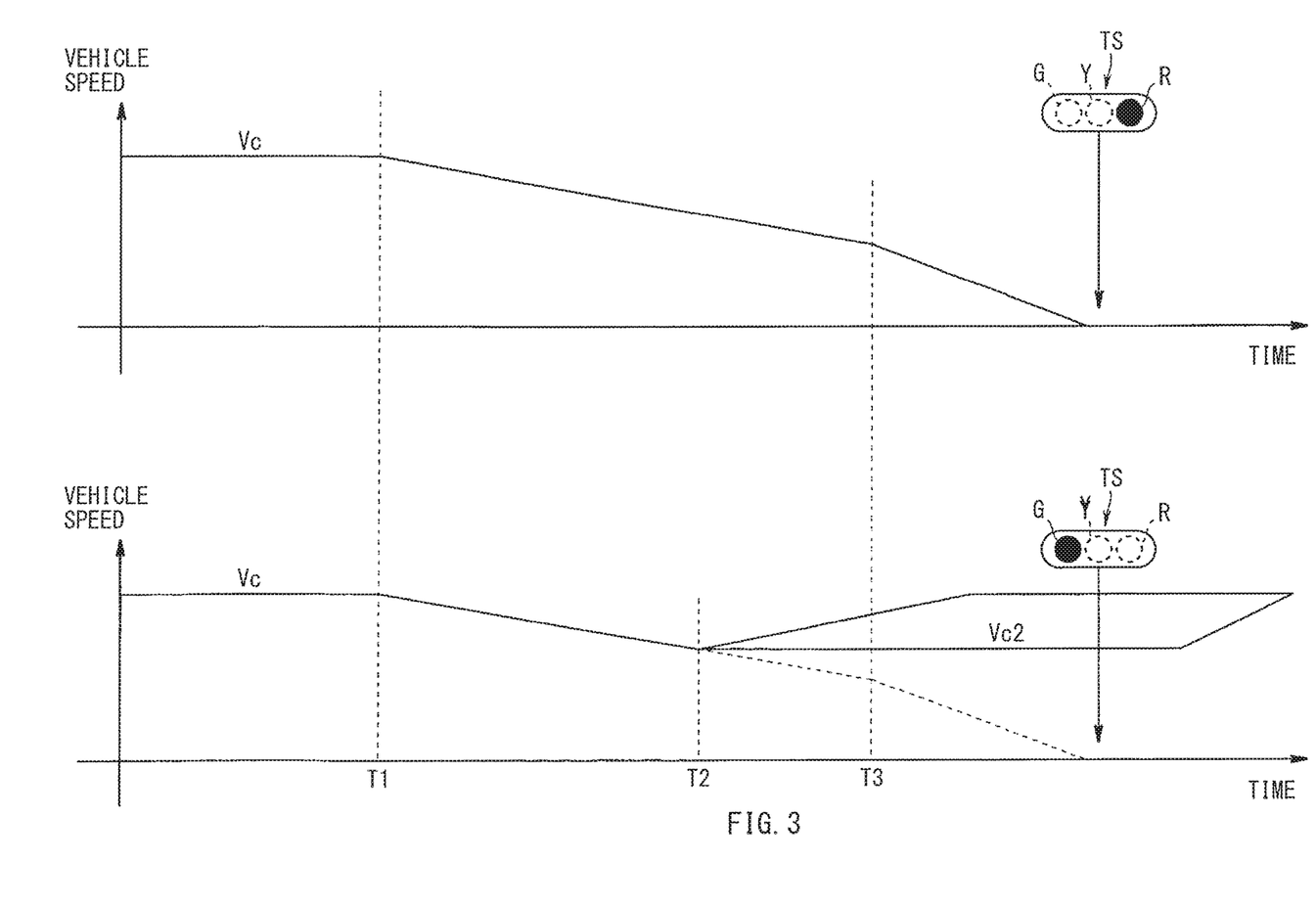
FIG. 3 is an explanatory diagram illustrating examples of signal colors indicated by the traffic signal and timings of increasing and decreasing a speed of a vehicle.

For example, referring to FIG. 3, the signal state of the traffic signal TS may be determined on a condition that: the presence of the traffic signal TS ahead of the own vehicle is detected from the map data during the traveling of the own vehicle at a constant speed Vc; and the traffic signal TS is located in a field of view of the camera unit 11 at time T1. When the signal state of the traffic signal TS is indistinguishable, i.e., when whether the traffic signal TS indicates a red signal R, a yellow signal Y, or a green signal G is indistinguishable, a brake may be so applied to the own vehicle as to decrease the speed of the own vehicle from the constant speed Vc by a predetermined deceleration rate. The passing speed at which the own vehicle passes the traffic signal TS may be thereby adjusted. The deceleration rate upon the decrease in speed of the own vehicle may be set taking into consideration a case where the signal state of the traffic signal TS becomes detectable as the own vehicle approaches the traffic signal TS. The deceleration rate may be therefore set slightly lower than the lowest deceleration rate that allows the vehicle to stop before the traffic signal TS or before an intersection provided with the traffic signal TS. The lowest deceleration rate may be calculated on the basis of a distance from the own vehicle to the traffic signal TS and the speed of the own vehicle.

Further, the braking may be increased to increase the deceleration rate and the own vehicle may be thereby stopped once before the traffic signal TS or the intersection provided with the traffic signal TS on any of: a condition that the signal state of the traffic signal TS is still undetectable when the own vehicle arrives at a stoppable limit position before the traffic signal TS or the intersection provided with the traffic signal TS at time T3 after the decreasing of the speed of the own vehicle is started at the time T1; a condition that the signal state of the traffic signal TS is detected at the time T3, and a distinction is made that the red signal R is indicated by the traffic signal TS as illustrated in FIG. 3 after the decreasing of the speed of the own vehicle is started at the time T1; and a condition that the signal state of the traffic signal TS is detected at the time T3, and a distinction is made that the yellow signal Y is indicated by the traffic signal TS after the decreasing of the speed of the own vehicle is started at the time T1. The stoppable limit position may be a position at or before which it is possible to stop the own vehicle before the traffic signal TS or the intersection provided with the traffic signal TS. Further, on a condition that the signal indicated by the traffic signal TS turns into the green signal G and safety of the periphery of the own vehicle is confirmed, the own vehicle may be started automatically to accelerate. Further, the speed of the own vehicle may be increased to a set vehicle speed, and the automatic traveling of the own vehicle along the target course may be continued.

In contrast, on a condition that the signal state of the traffic signal TS becomes detectable at time T2 before the time T3, the passing speed may be adjusted in accordance with the detected signal state of the traffic signal TS. On a condition that a distinction is made that one of the red signal R and the yellow signal Y is indicated by the traffic signal TS at the time T2, the decreasing of the speed of the own vehicle may be continued, and the deceleration rate may be switched, at the time T3, to a deceleration rate that allows the own vehicle to be stoppable before the traffic signal TS or the intersection provided with the traffic signal TS. In contrast, on a condition that a distinction is made that the green signal G is indicated by the traffic signal TS at the time T2, the own vehicle may be caused to pass the traffic signal TS while a speed Vc2 at the time T2 is maintained. The speed Vc2 at the time T2 may be a speed as a result of the decrease in speed of the own vehicle from the constant speed Vc. In another example, on the condition that the distinction is made that the green signal G is indicated by the traffic signal TS at the time T2, the speed of the own vehicle may be increased from the speed Vc2 at the time T2 toward the constant speed Vc, and the own vehicle may be thereby caused to pass the traffic signal TS.

The controller 104 may decrease the traveling speed of the own vehicle via the brake controller 60, in response to the speed adjustment instruction directed to decreasing of the speed of the own vehicle given from the passing speed adjusting unit 103. The controller 104 may also increase the traveling speed of the own vehicle via the engine controller 40, in response to the speed adjustment instruction directed to increasing of the speed of the own vehicle given from the passing speed adjusting unit 103. In one implementation, the controller 104 may also perform a control of the transmission via the transmission controller 50 where appropriate in addition to the above-described decreasing of the traveling speed of the own vehicle via the brake controller 60 or the above-described increasing of the traveling speed of the own vehicle via the engine controller 40.

Figure 4:
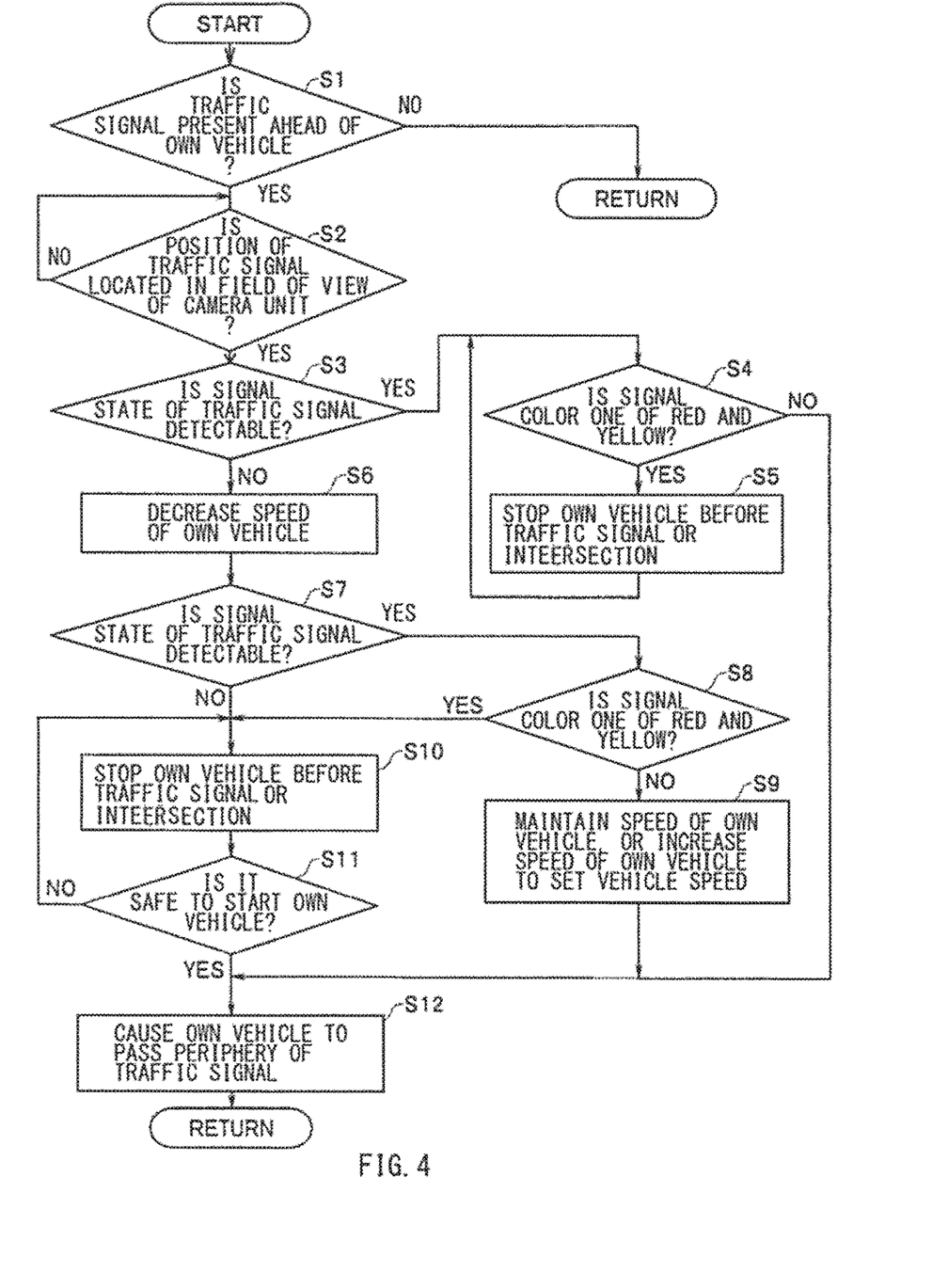
FIG. 4 is a flowchart illustrating a traffic signal passing control process.

A description is given below of a program process of a traffic signal passing control performed by the respective functional units of the traveling controller 100 described above, with reference to the flowchart illustrated in FIG. 4.

In a first step S1 of the traffic signal passing control process, searching may be performed through the map database DB to determine whether the traffic signal is present ahead of the own vehicle. When the traffic signal is absent ahead of the own vehicle (step S1: NO), the traffic signal passing control process may be ended. When the traffic signal is present ahead of the own vehicle (step S1: YES), the flow may proceed to step S2.

In step S2, a determination may be made as to whether, as a result of proceeding of the own vehicle, the own vehicle has arrived at a position at which the camera unit 11 captures the traffic signal in its field of view and the traffic signal is thus detectable. When the position of the traffic signal is still outside of the field of view of the camera unit 11 (step S2: NO), a transition in the flow from step S2 may not be made until the own vehicle position is varied in accordance with elapse of time. Further, when the position of the traffic signal enters the field of view of the camera unit 11, the flow may proceed from step S2 to step S3.

In step S3, a determination may be made as to whether the signal color of the traffic signal is distinguishable by detecting the signal state of the traffic signal on the basis of the image ahead of the own vehicle that is captured by the camera unit 11. When the signal color of the traffic signal is distinguishable (step S3: YES), the flow may proceed to step S4. In step S4, a determination may be made as to whether the signal color of the traffic signal is one of red and yellow. When the signal color is green (step S4: NO), the flow may proceed from step S4 to step S12. In step S12, the own vehicle may be caused to pass the periphery of the traffic signal. When the signal color is one of red and yellow (step S4: YES), the flow may proceed from step S4 to step S5. In step S5, the own vehicle may be stopped before the traffic signal or the intersection provided with the traffic signal. Thereafter, the flow may return to step S4, and the own vehicle may be thereby kept being stopped until the signal color indicated by the traffic signal turns green. Further, after the signal color indicated by the traffic signal turns green, the own vehicle may be started, and the flow may proceed to step S12. In step S12, the own vehicle may be caused to pass the periphery of the traffic signal.

In contrast, when the signal state of the traffic signal is undetectable on the basis of the captured image in step S3 (step S3: NO), the flow may proceed from step S3 to step S6. The signal state of the traffic signal may be undetectable due to the weather condition such as a snowstorm, a dense fog, or a heavy rain, a power failure, a malfunction in the traffic signal, or any other factor that prevents detection of the signal state of the traffic signal. In step S6, the traveling speed of the own vehicle may be decreased at the predetermined deceleration rate. Thereafter, the flow may proceed from step S6 to step S7. In step S7, a determination may be made again as to whether the signal state of the traffic signal is detectable.

When the signal state is still undetectable in step S7 (step S7: NO), the flow may proceed from step S7 to step S10. In step S10, the own vehicle may be stopped before the traffic signal or the intersection provided with the traffic signal. Thereafter, in step S11, whether it is safe to start the own vehicle may be confirmed. When the safety is confirmed (step S11: YES), the own vehicle may be started. Thereafter, in step S12, the own vehicle may be caused to pass the periphery of the traffic signal. When the safety is not confirmed in step S11 (step S11: NO), the flow may return to step S10.

In contrast, when the signal state is detectable in step S7 (step S7: YES), the flow may proceed from step S7 to step S8. In step S8, a determination may be made as to whether the signal color indicated by the traffic signal is one of red and yellow. When the signal color indicated by the traffic signal is one of red and yellow (step S8: YES), the flow may proceed from step S8 to step S10. In step S10, the own vehicle may be stopped before the traffic signal or the intersection provided with the traffic signal. Thereafter, on a condition that the signal color indicated by the traffic signal turns green and the safety in starting the own vehicle is confirmed in step S11, the own vehicle may be started. Thereafter, in step S12, the own vehicle may be caused to pass the periphery of the traffic signal.

In contrast, when the signal color indicated by the traffic signal is green in step S8 (step S8: NO), the flow may proceed from step S8 to step S9. In step S9, the speed of the own vehicle may be maintained at the current speed or may be increased to a set vehicle speed. Further, the flow may proceed from step S9 to step S12. In step S12, the own vehicle may be caused to pass the periphery of the traffic signal.

According to one implementation of the technology, on a condition that the state of the traffic signal is undetectable when the own vehicle is to pass the periphery of the traffic signal, adjustment of the passing speed at which the own vehicle passes the periphery of the traffic signal may be so performed as to perform the passing speed decreasing operation, as described above. The passing speed decreasing operation may include decreasing of the passing speed of the own vehicle and stopping of the own vehicle. This makes it possible to allow the own vehicle to safely pass the periphery of the traffic signal even when the state of the traffic signal is undetectable. Further, when a distinction is made that the traffic signal indicates one of the red signal and the yellow signal, decreasing of the passing speed of the own vehicle may be continued. When a distinction is made that the traffic signal indicates the green signal, the passing speed of the own vehicle may be maintained or increased to the set vehicle speed. It is therefore possible to allow the own vehicle to safely and smoothly pass the periphery of the traffic signal. Hence, it is possible to improve safety in a case where the own vehicle passes the periphery of the traffic signal.

The above-described technique disclosed in JP-A No. 2005-119413 is provided on the premise that a state of a traffic signal is recognizable by acquiring traffic signal information from an external apparatus such as that at a traffic control center. Therefore, the technique disclosed in JP-A No. 2005-119413 necessitates some other m upon causing a vehicle to pass a periphery of the traffic signal, in a case where the acquisition of the traffic signal information is prevented from a factor such as radio interference or a power failure. In this case, a method may be used that captures an image of the traffic signal by a camera mounted on the vehicle, and makes a distinction of a signal color of the traffic signal on the basis of the captured image. Upon using the foregoing method, however, the distinction of the signal color may be prevented, in some cases, by a weather condition such as a snowstorm, a dense fog, or a heavy rain, which makes it difficult to recognize the state of the traffic signal.

The traveling controller 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling controller 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the traveling controller 100 illustrated in FIG. 1.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A traveling control system for vehicle, the traveling control system comprising:
a map database configured to store map data, the map data including information regarding one or more traffic signals provided on a road along which an own vehicle travels;
a detector configured to detect a signal state of any, of the one or more traffic signals, that is located ahead of the own vehicle;
a traffic signal searching unit configured to search for a nearest traffic signal from the map database, the nearest traffic signal being any, of the one or more traffic signals, that is located ahead of the own vehicle and is nearest to the own vehicle; and
a speed adjusting unit configured to perform, when the signal state of the nearest traffic signal searched for by the traffic signal searching unit is not detectable by the detector, adjustment of a passing speed of the own vehicle to thereby perform a passing speed decreasing operation, the passing speed being a speed at which the own vehicle passes a periphery of the nearest traffic signal, the passing speed decreasing operation including decreasing of the passing speed of the own vehicle, stopping of the own vehicle, or both, wherein
the detector makes a distinction of a signal color, as the signal state, indicated by any, of the one or more traffic signals, that is located ahead of the own vehicle,
the speed adjusting unit continues the passing speed decreasing operation on a condition that, after the passing speed decreasing operation is performed, the signal state of the nearest traffic signal becomes detectable by the detector and a distinction is made that the nearest traffic signal indicates one of a red signal color and a yellow signal color, and
the speed adjusting unit causes the passing speed of the own vehicle to be maintained or to be increased to a set vehicle speed on a condition that, after the passing speed decreasing operation is performed, the signal state of the nearest traffic signal becomes detectable by the detector and a distinction is made that the nearest traffic signal indicates a green signal color.

2. The traveling control system for vehicle according to claim 1, wherein
the speed adjusting unit is configured to decrease, when the signal state of the nearest traffic signal by the traffic signal searching unit is not detectable by the detector, the passing speed of the own vehicle at a deceleration rate, and
the deceleration rate is set lower than a lowest deceleration rate that allows the own vehicle to stop before the nearest traffic signal or before an intersection provided with the nearest traffic signal.

3. A traveling control system for vehicle, the traveling control system comprising:
a map database configured to store map data, the map data including information regarding one or more traffic signals provided on a road along which an own vehicle travels; and
circuitry configured to:
detect a signal state of any, of the one or more traffic signals, that is located ahead of the own vehicle;
search for a nearest traffic signal from the map database, the nearest traffic signal being any, of the one or more traffic signals, that is located ahead of the own vehicle and is nearest to the own vehicle; and
perform, when the signal state of the nearest traffic signal is not detectable, adjustment of a passing speed of the own vehicle to thereby perform a passing speed decreasing operation, the passing speed being a speed at which the own vehicle passes a periphery of the nearest traffic signal, the passing speed decreasing operation including decreasing of the passing speed of the own vehicle, stopping of the own vehicle, or both,
wherein the circuitry is configured to:
make a distinction of a signal color, as the signal state, indicated by any, of the one or more traffic signals, that is located ahead of the own vehicle;
continue the passing speed decreasing operation on a condition that, after the passing speed decreasing operation is performed, the signal state of the nearest traffic signal becomes detectable by a detector and a distinction is made that the nearest traffic signal indicates one of a red signal color and a yellow signal color; and
cause the passing speed of the own vehicle to be maintained or to be increased to a set vehicle speed on a condition that, after the passing speed decreasing operation is performed, the signal state of the nearest traffic signal becomes detectable by the detector and a distinction is made that the nearest traffic signal indicates a green signal color.

4. The traveling control system for vehicle according to claim 3, wherein
the circuitry is configured to decrease, when the signal state of the nearest traffic signal by a traffic signal searching unit is not detectable by the detector, the passing speed of the own vehicle at a deceleration rate, and
the deceleration rate is set lower than a lowest deceleration rate that allows the own vehicle to stop before the nearest traffic signal or before an intersection provided with the nearest traffic signal.

5. A traveling control method for vehicle, the traveling control method comprising:
detecting a signal state of any, of one or more traffic signals, that is located ahead of an own vehicle;
searching for a nearest traffic signal from a map database, the nearest traffic signal being any, of the one or more traffic signals, that is located ahead of the own vehicle and is nearest to the own vehicle, the map data being stored in a map database and including information regarding one or more traffic signals provided on a road along which an own vehicle travels; and
performing, when the signal state of the nearest traffic signal searched for by the traffic signal searching unit is not detectable by a detector, adjustment of a passing speed of the own vehicle to thereby perform a passing speed decreasing operation, the passing speed being a speed at which the own vehicle passes a periphery of the nearest traffic signal, the passing speed decreasing operation including decreasing of the passing speed of the own vehicle, stopping of the own vehicle, or both, wherein
the detecting of the signal state includes making a distinction of a signal color, as the signal state, indicated by any, of the one or more traffic signals, that is located ahead of the own vehicle,
the performing adjustment of the passing speed of the own vehicle includes:

continuing the passing speed decreasing operation on a condition that, after the passing speed decreasing operation is performed, the signal state of the nearest traffic signal becomes detectable by the detector and a distinction is made that the nearest traffic signal indicates one of a red signal color and a yellow signal color, and causing the passing speed of the own vehicle to be maintained or to be increased to a set vehicle speed on a condition that, after the passing speed decreasing operation is performed, the signal state of the nearest traffic signal becomes detectable by the detector and a distinction is made that the nearest traffic signal indicates a green signal color.

* * * * *